United States Patent
Yarimizu et al.

(10) Patent No.: US 7,508,193 B2
(45) Date of Patent: Mar. 24, 2009

(54) ENCODER

(75) Inventors: Kenichi Yarimizu, Fukushima (JP);
Shinji Nagasawa, Fukushima (JP);
Yoshiaki Ono, Fukushima (JP); Naoto Kobayashi, Fukushima (JP)

(73) Assignee: NOK Corporation, Tokyo (JP)

( * ) Notice: Subject to any disclaimer, the term of this patent is extended or adjusted under 35 U.S.C. 154(b) by 83 days.

(21) Appl. No.: 11/597,660

(22) PCT Filed: Apr. 14, 2005

(86) PCT No.: PCT/JP2005/007206

§ 371 (c)(1),
(2), (4) Date: Nov. 24, 2006

(87) PCT Pub. No.: WO2005/116588

PCT Pub. Date: Dec. 8, 2005

(65) Prior Publication Data

US 2007/0182406 A1    Aug. 9, 2007

(30) Foreign Application Priority Data

May 27, 2004    (JP)   ............... 2004-157027

(51) Int. Cl.
*G01P 3/48* (2006.01)
*G01P 3/54* (2006.01)
*H02K 11/00* (2006.01)
*H02K 23/66* (2006.01)
*H02K 21/12* (2006.01)

(52) U.S. Cl. ................. 324/174; 310/68 B; 310/156.45

(58) Field of Classification Search ................. 335/301, 335/302, 306; 324/207.25; 174/350–397; 336/84; 310/156.05, 156.06, 67 R, 156.43

See application file for complete search history.

(56) References Cited

U.S. PATENT DOCUMENTS

| | | | | |
|---|---|---|---|---|
| 2,968,800 | A * | 1/1961 | Guerth | 340/870.44 |
| 3,456,097 | A * | 7/1969 | Hini | 377/3 |
| 3,530,323 | A * | 9/1970 | Applequist | 310/168 |
| 4,146,806 | A * | 3/1979 | Katsumata | 310/153 |
| 4,257,040 | A * | 3/1981 | Shirasaki et al. | 340/671 |
| 4,369,405 | A * | 1/1983 | Sato et al. | 324/174 |
| 4,455,516 | A * | 6/1984 | Furusho | 318/400.41 |
| 4,746,862 | A * | 5/1988 | Ueki | 324/207.25 |

(Continued)

FOREIGN PATENT DOCUMENTS

JP    55-035203    3/1980

(Continued)

*Primary Examiner*—Elvin G Enad
*Assistant Examiner*—Alexander Talpalatskiy
(74) *Attorney, Agent, or Firm*—Jacobson Holman PLLC (57) ABSTRACT

To easily manufacture an encoder, in which N-poles and S-poles of magnets are arranged alternately in a circumferential direction and in which an unequal pitch portion is provided in a part on a circumference, without using a magnetizing head of a special shape having an unequal pitch portion, the unequal pitch portion is formed by arranging the N-poles and the S-poles at an equal pitch all over the circumference and then providing a part on the circumference with a shielding member for shielding a magnetism. Alternatively, the unequal pitch portion is formed by arranging the N-poles and the S-poles at an equal pitch all over the circumference and then providing a part on the circumference with a cut portion.

1 Claim, 6 Drawing Sheets

U.S. PATENT DOCUMENTS

| | | | | |
|---|---|---|---|---|
| 4,755,701 A | * | 7/1988 | Shikama | 310/156.05 |
| 5,539,368 A | * | 7/1996 | Yamashita | 335/302 |
| 5,631,093 A | * | 5/1997 | Perry et al. | 428/611 |
| 5,654,600 A | * | 8/1997 | Nomura et al. | 310/68 B |
| 5,847,483 A | * | 12/1998 | Suzuki et al. | 310/156.45 |
| 6,743,340 B2 | * | 6/2004 | Fu | 204/192.12 |
| 7,005,847 B2 | * | 2/2006 | Gassman et al. | 324/207.25 |
| 7,019,515 B2 | * | 3/2006 | Sentoku | 324/207.25 |
| 7,112,956 B2 | * | 9/2006 | Shibata et al. | 324/207.25 |
| 7,237,960 B2 | * | 7/2007 | Oohira et al. | 384/448 |
| 7,307,414 B2 | * | 12/2007 | Ito | 324/174 |
| 7,362,018 B1 | * | 4/2008 | Kulogo et al. | 310/68 B |

FOREIGN PATENT DOCUMENTS

| | | | |
|---|---|---|---|
| JP | 56-12815 | | 2/1981 |
| JP | 2003-237269 | | 8/2003 |
| JP | 2003-270257 | | 9/2003 |
| JP | 2003-270258 | | 9/2003 |
| JP | 2004084925 A | * | 3/2004 |
| JP | 2004101312 A | * | 4/2004 |

* cited by examiner

PRIOR ART

ENCODER

This is a nationalization of PCT/JP05/007206 filed Apr. 14, 2005 and published in Japanese.

BACKGROUND OF THE INVENTION

1. Field of the Invention

The present invention relates to an encoder combined with a magnetic sensor and used for detecting a rotating speed, an angle of rotation and the like of a rotating part such as a rotating shaft or the like.

2. Description of the Conventional Art

Figure 8:
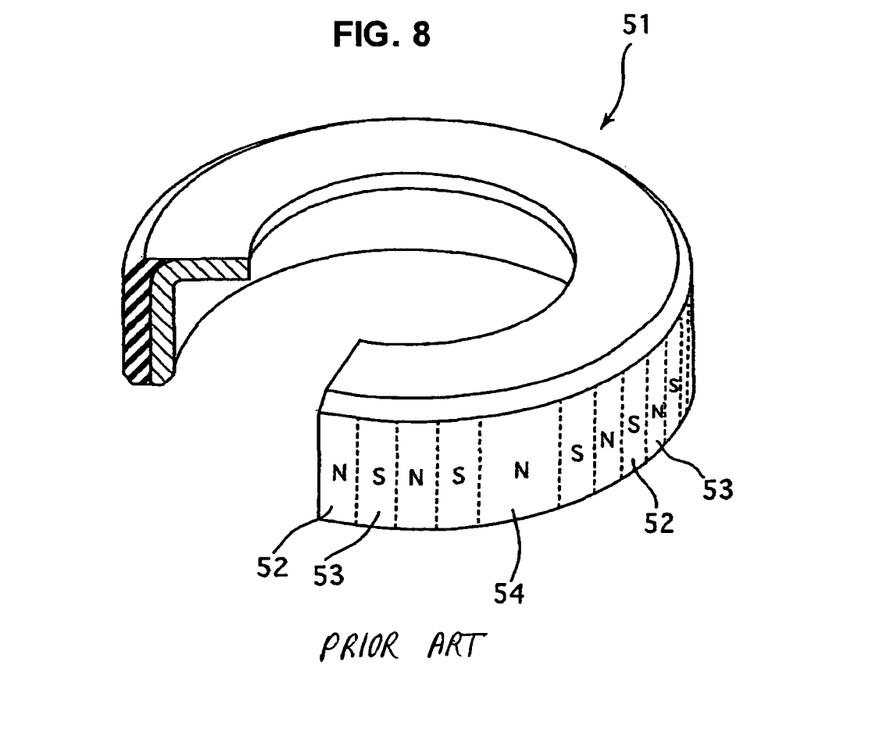
FIG. 8 is a partly cut perspective view of an encoder in accordance with a conventional art.

Conventionally, as shown in FIG. 8, there has been known an encoder 51 in which N poles 52 and S poles 53 of magnets are arranged alternately in a circumferential direction at an equal pitch. Further, for example, in the encoder 51 for an engine in which it is necessary to specify an angle of rotation of the rotating shaft, in order to specify a rotational position thereof, an unequal pitch portion 54 forming a reference point on the circumference is provided in a part on the circumference.

However, in conventional, since the encoder 51 is manufactured by using a magnetizing head having a special shape provided with the unequal pitch portion in a part on the circumference of a magnetism applying portion, for forming the unequal pitch portion 54 in the encoder 51, the magnetizing head is exclusively used, so that there is a disadvantage that it is necessary to manufacture the magnetizing head per item of the encoder 51. The magnetizing head having the special shape provided with the unequal pitch portion mentioned above has a complicated shape and is expensive.

Further, as another conventional art of the present invention, Japanese Unexamined Patent Publication No. 2003-270258 describes an encoder (a pulsar ring) which is constituted by an annular support member and at least one band-shaped magnetizing body attached along a peripheral direction of the annular support member, and in which mutually facing end magnetic poles of the magnetizing body are set to be the same pole and a gap is formed in confronted portion of the magnetizing bodies, whereby a detected portion for a reference position signal having a small bottom value existing a peak portion of an output signal is formed at least one position on a circumference of the ring. However, the conventional art described in this publication also necessary to use the magnetizing head having the special shape provided with the unequal pitch portion.

SUMMARY OF THE INVENTION

Problem to be Solved by the Invention

The present invention is made by taking the points mentioned above into consideration, and an object of the present invention is to provide such an encoder that an encoder provided with an unequal pitch portion can be easily manufactured without using a magnetizing head or the like having a special shape provided with the unequal pitch portion.

Means for Solving the Problem

In order to achieve the object mentioned above, in accordance with a first aspect of the present invention, there is provided an encoder in which N poles and S poles of magnets are arranged alternately in a circumferential direction at an equal pitch and an unequal pitch portion is provided in a part on a circumference, wherein the unequal pitch portion is formed by arranging the N poles and the S poles at an equal pitch all over the circumference and forming a shielding body shielding a magnetism in a part on the circumference.

Further, in accordance with a second aspect of the present invention, there is provided an encoder in which N poles and S poles of magnets are arranged alternately in a circumferential direction at an equal pitch and an unequal pitch portion is provided in a part on a circumference, wherein the unequal pitch portion is formed by arranging the N poles and the S poles at an equal pitch all over the circumference and forming a cut portion in a part on the circumference.

In the encoder in accordance with the first aspect of the present invention provided with the structure mentioned above, since the structure is made such that the unequal pitch portion is formed by arranging the shielding body shielding the magnetism in a part on the circumference, it is enough that the N poles and the S poles are arranged in the encoder itself at the equal pitch all over the circumference. In other words, even if the N poles and the S poles are arranged at the equal pitch all over the circumference, the unequal pitch portion can be formed by arranging the shielding body shielding the magnetism in a part on the circumference.

Further, in the encoder in accordance with the second aspect of the present invention provided with the structure mentioned above, since the structure is made such that the unequal pitch portion is formed by arranging the cut portion in a part on the circumference, it is also enough that the N poles and the S poles are arranged in the encoder itself at the equal pitch all over the circumference. In other words, even if the N poles and the S poles are arranged at the equal pitch all over the circumference, the unequal pitch portion can be formed by arranging the cut portion in a part on the circumference. In this case, in the manufacturing process of the encoder in accordance with the second aspect, in a step of magnetizing the encoder and a step of forming the cut portion, the former magnetizing step is executed prior to the latter cutting step, however, the latter cutting step may be executed in advance.

Effect of the Invention

The present invention achieves the following effects.

In the encoder in accordance with the first aspect of the present invention, since the structure is made such that the unequal pitch portion is formed by arranging the shielding body shielding the magnetism in a part on the circumference, it is enough that the N poles and the S poles are arranged in the encoder itself at the equal pitch all over the circumference. Accordingly, it is possible to manufacture the encoder by using a general-purpose type magnetizing head or the like having no unequal pitch portion. Further, even in the case of using the general-purpose type magnetizing head, it is possible to easily form the unequal pitch portion by arranging the shielding body shielding the magnetism in a part on the circumference. Further, it is possible to easily change a magnetic force characteristic of the encoder by changing a thickness and a width in a circumferential direction of the shielding body. Further, since it is possible to visually check the position of the unequal pitch portion, it is possible to effectively prevent an erroneous assembly.

Further, in the encoder in accordance with the second aspect of the present invention, since the structure is made such that the unequal pitch portion is formed by arranging the cut portion in a part on the circumference, it is enough that the N poles and the S poles are arranged in the encoder itself at the equal pitch all over the circumference. Accordingly, it is possible to manufacture the encoder by using a general-purpose type magnetizing head or the like having no unequal pitch portion. Further, even in the case of using the general-purpose type magnetizing head, it is possible to easily form the unequal pitch portion by arranging the cut portion in a part on the circumference. Further, it is possible to easily change a magnetic force characteristic of the encoder by changing a depth and a width in a circumferential direction of the cut portion. Further, since it is possible to visually check the position of the unequal pitch portion, it is possible to effectively prevent an erroneous assembly.

DESCRIPTION OF REFERENCE NUMERALS 1 encoder
2 encoder main body
3 support ring
3a flat surface portion
3b tubular portion
4 magnetizing portion
5 N pole
6 S pole
7 Shielding body
7a shielding portion
7b back surface portion
7c connection portion
8 unequal pitch portion
9 cut portion

BEST MODE FOR CARRYING OUT THE INVENTION

The present application includes the following modes.

(1) A magnetization is executed at an equal pitch all over the surface, and an unequal pitch is achieved by applying the following process only to a portion where an unequal pitch is necessary.

(a) A magnetic body (a shielding body) is attached only the unequal pitch portion, and a magnetic force is shielded.

(b) A rubber (an encoder main body) is removed only from the unequal pitch portion, and a generation of the magnetic force is weakened.

(2) In accordance with the item (a) or (b) mentioned above, the magnetic head can be constituted by a general-purpose magnetic head, and can be commonly used.

(3) A magnetizing method may be constituted by a head type or an index type.

(4) In the case of the item (a) mentioned above, since the magnetic force in the portion can be controlled by a thickness of the shielding magnetic body, it is possible to freely set within a gap with respect to the sensor.

(5) In both of the items (a) and (b) mentioned above, since the position can be visually checked, it is possible to prevent an erroneous assembly.

(6) An encoder in which N poles and S poles of magnets are arranged alternately in a circumferential direction at an equal pitch and an unequal pitch portion is provided in a part on a circumference, wherein the encoder has an encoder main body in which the N poles and the S poles are arranged at an equal pitch all over the circumference, and a shielding body attached to a part on the circumference of the encoder main body and shielding a magnetism in the position, and a width in a circumferential direction of the shielding body is formed larger than a width of one pitch of the N poles or the S poles.

(7) An encoder in which N poles and S poles of magnets are arranged alternately in a circumferential direction at an equal pitch and an unequal pitch portion is provided in a part on a circumference, wherein the encoder has an encoder main body in which the N poles and the S poles are arranged at an equal pitch all over the circumference, and a cut portion provided in a part on the circumference of the encoder main body and weakening a magnetism in the position, and a width in a circumferential direction of the cut portion is formed larger than a width of one pitch of the N poles or the S poles.

(8) A forming method of an unequal pitch portion in an encoder in which N poles and S poles of magnets are arranged alternately in a circumferential direction at an equal pitch and an unequal pitch portion is provided in a part on a circumference, wherein the unequal pitch portion is formed by arranging the N poles and the S poles in the encoder at an equal pitch all over the circumference and next attaching a shielding body shielding a magnetism in a part on the circumference.

(9) A forming method of an unequal pitch portion in an encoder in which N poles and S poles of magnets are arranged alternately in a circumferential direction at an equal pitch and an unequal pitch portion is provided in a part on a circumference, wherein the unequal pitch portion is formed by arranging the N poles and the S poles in the encoder at an equal pitch all over the circumference and next cutting a part on the circumference so as to form a cut portion.

(10) A forming method of an unequal pitch portion in an encoder in which N poles and S poles of magnets are arranged alternately in a circumferential direction at an equal pitch and an unequal pitch portion is provided in a part on a circumference, wherein the unequal pitch portion is formed by cutting a part on the circumference of the encoder so as to form a cut portion, and next arranging the N poles and the S poles at an equal pitch all over the circumference of the encoder.

DETAILED DESCRIPTION OF PREFERRED EMBODIMENTS

Next, a description will be given of embodiments in accordance with the present invention with reference to the accompanying drawings.

First Embodiment

Figure 1:
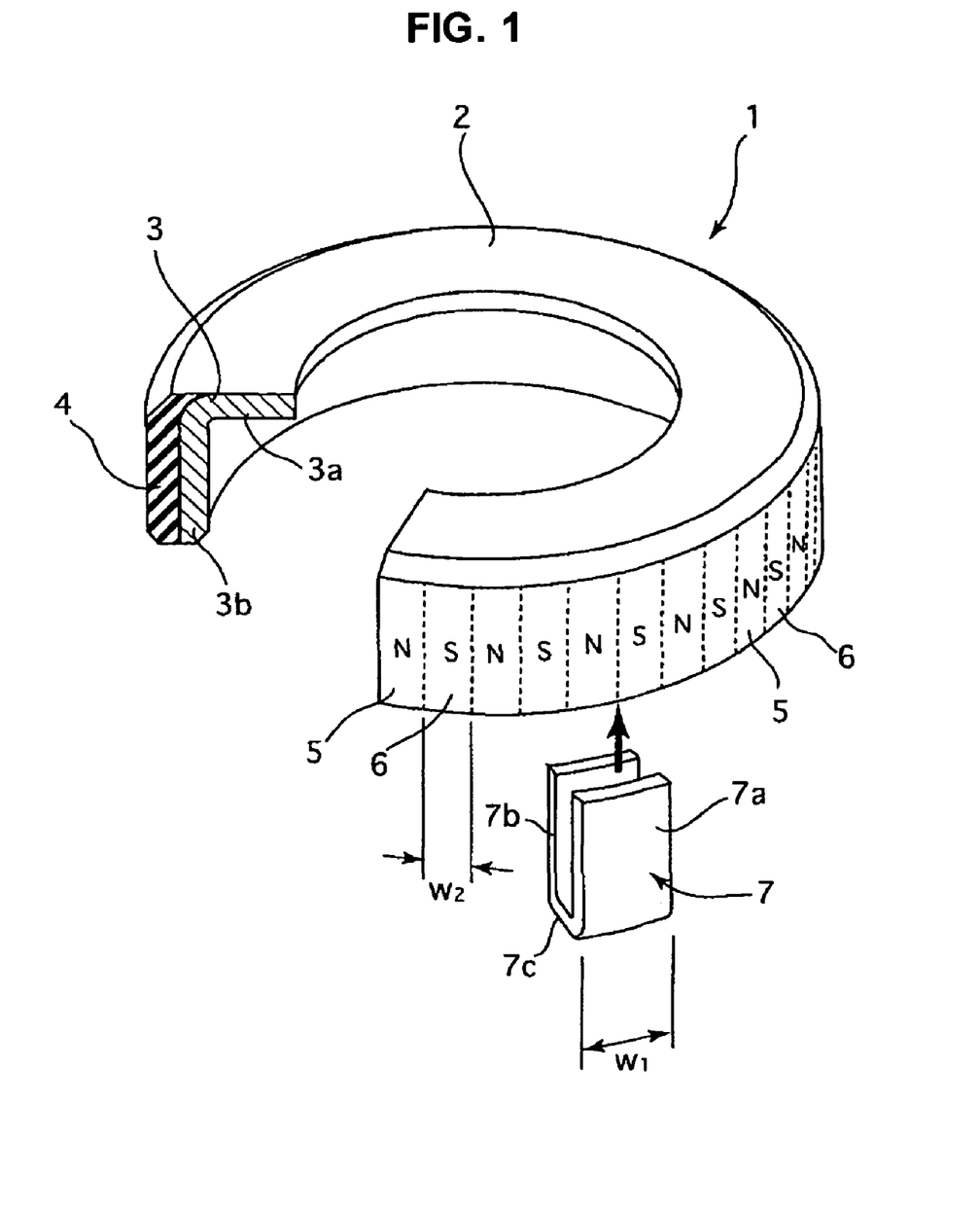
FIG. 1 is a partly cut perspective view showing a manufacturing process of an encoder in accordance with a first embodiment of the present invention.
Figure 2:
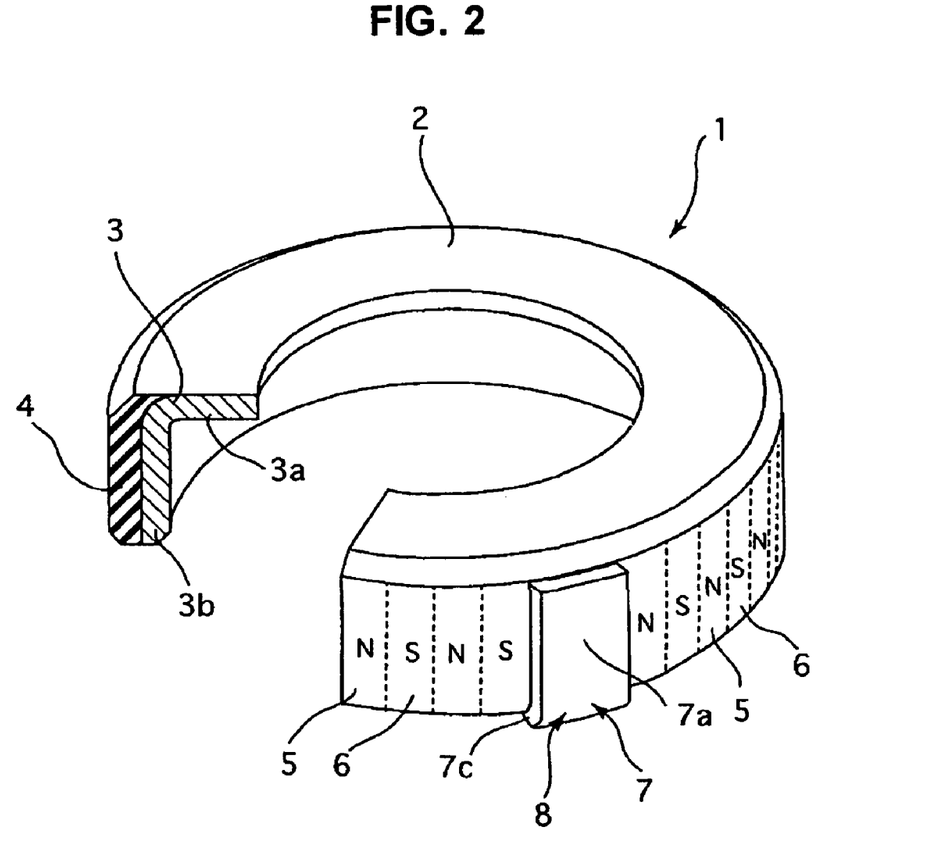
FIG. 2 is a partly cut perspective view showing a completed state of the encoder.
Figure 3:
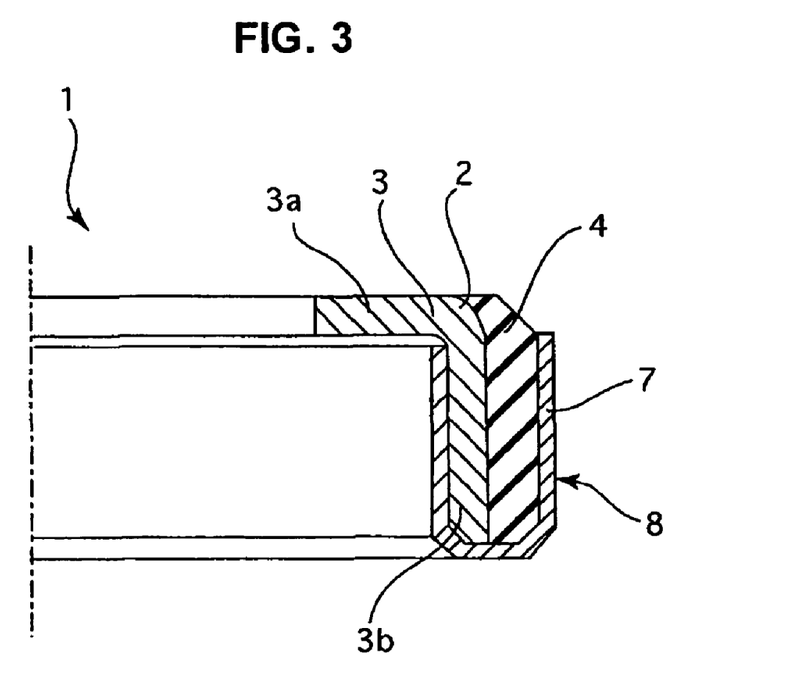
FIG. 3 is a half cut cross sectional view of the encoder.

FIGS. 1 to 3 show an encoder 1 in accordance with a first embodiment of the present invention, in which FIG. 1 is a partly cut perspective view showing a manufacturing process of the encoder 1, FIG. 2 is a partly cut perspective view showing a completed state of the encoder 1, and FIG. 3 is a half cut cross sectional view of the encoder 1, respectively.

As shown in FIG. 2, the encoder 1 in accordance with the embodiment is structured such that N poles 5 and S poles 6 of magnets are arranged alternately at an equal pitch in a circumferential direction, and an unequal pitch portion 8 is provided in a part on a circumference. As shown in FIG. 1, the encoder 1 has an encoder main body 2 in which the N poles 5 and the S poles 6 are arranged at an equal pitch all over the circumference, and a shielding body 7 attached to a part on the circumference of the encoder main body 2 and shielding a magnetism at this position. Since the shielding body 7 is attached to a part on the circumference of the encoder main body 2, it is possible to suppress a radiation of a magnetic signal in this attached position, whereby the attached position is formed as the unequal pitch portion 8.

The encoder main body 2 has a support ring 3, and an annular magnetizing portion 4 attached to the support ring 3, and the N poles 5 and the S poles 6 are arranged in the magnetizing portion 4 at an equal pitch all over the circumference. The support ring 3 is formed in an L-shaped cross section by a magnetic body such as a metal or the like so as to integrally have an annular flat surface portion 3a and a tubular portion 3b, and the magnetizing portion 4 is attached to an outer peripheral surface of the tubular portion 3b. The magnetizing portion 4 is formed in a cylindrical shape by a rubber-like elastic material mixed with a magnetic powder therein, and is structured such that the N poles 5 and the S poles 6 are arranged at the equal pitch all over the circumference by a magnetizing means constituted by a known head system or an index system or the like.

The shielding body 7 is formed in a U-shaped cross section or a J-shaped cross section (the U-shaped cross section in the drawing) by a magnetic body such as a metal or the like, integrally has a shielding portion 7a arranged in an outer peripheral surface side of the magnetizing portion 4, a back surface portion 7b arranged in an inner peripheral surface side of the tubular portion 3b of the support ring 3, and a connection portion 7c connecting the shielding portion 7a and the back surface portion 7b, and is attached to a part on a circumference of the encoder main body 2 by being pressure inserted to the tubular portion 3b of the support ring 3 and the magnetizing portion 4 attached to an outer peripheral surface of the tubular portion from one side in an axial direction, thereby being structured such as to cover a part on the circumference of the magnetizing portion 4. Further, a width w1 in a circumferential direction of the shielding body 7 is formed larger than a width w2 of one pitch of the N poles 5 and the S poles 6 (w1>w2). Accordingly, when the shielding body 7 is attached to the encoder main body 2, the magnetizing portion 4 is covered over a larger width range than the width w2 of one pitch of the N poles 5 or the S poles 6. Therefore, the radiation of the magnetic signal is suppressed in this covered position, whereby the covered position is formed as the unequal pitch portion 8. In the drawing, the width w1 in the circumferential direction of the shielding body 7 is set to a width of two pitches of the N poles 5 or the S poles 6 (w1=w2×2).

The encoder 1 having the structure mentioned above is attached to a rotating part such as a rotating shaft of the like, is combined with the magnetic sensor and is used for detecting a rotating speed, an angle of rotation and the like of the rotating part, thereby having a feature in a point that the following operations and effects can be achieved by the above structure.

Since the encoder 1 having the structure mentioned above is structured such that the unequal pitch portion 8 is formed by attaching the shielding body 7 shielding the magnetism to a part on the circumference of the encoder main body 2 so as to suppress the radiation of the magnetism at this attached position, it is not necessary to directly form the unequal pitch portion 8 in the encoder main body 2 itself, and it is enough to simply arrange the N poles 5 and the S poles 6 in the encoder main body 2 at the equal pitch all over the circumference. Accordingly, since it is possible to manufacture the encoder 1 by using the general-purpose type magnetizing head or the like having the comparatively simple structure having no unequal pitch portion, it is possible to extremely easily manufacture the encoder 1 provided with the unequal pitch portion 8.

Figure 4:
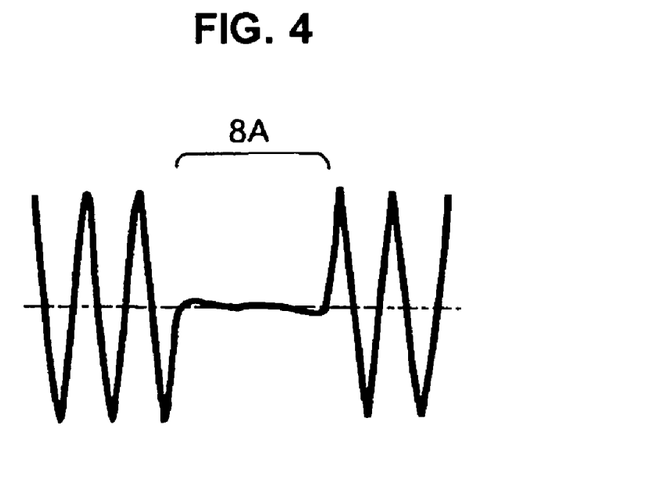
FIG. 4 is a graph showing a magnetic characteristic of the encoder.

Further, even if the general-purpose type magnetizing head or the like is used, it is possible to easily form the unequal pitch portion 8 by attaching the shielding body 7 shielding the magnetism to a part on the circumference of the encoder main body 2. A waveform model of a magnetic pulse of the encoder 1 is, for example, as shown in FIG. 4, and it is possible to easily detect a position of the origin of the rotating operation on the basis of an existence of a non-deviation position caused by the unequal pitch portion 8 shown by reference symbol 8A in the drawing.

Further, it is possible to easily change a magnetic force characteristic of the encoder 1 by changing a thickness or the width w1 in the circumferential direction of the shielding body 7 later attached to the encoder main body 2.

Further, in accordance with the structure mentioned above, since it is possible to check the position of the unequal pitch portion 8 on the basis of an outer appearance of the encoder 1, it is possible to easily prevent an erroneous assembly.

In this case, in the embodiment mentioned above, the structure is made such that the shielding body 7 is formed in the U-shaped or J-shaped cross section so as to be pressure inserted to the encoder main body 2 from one side in the axial direction, however, the mounting structure or the mounting method of the shielding body 7 to the encoder main body 2 is not limited. The shielding body 7 may be structured variously as far as the shielding body 7 is attached to the encoder main body 2 so as to cover a part of the magnetizing portion 4.

Second Embodiment

Figure 5:
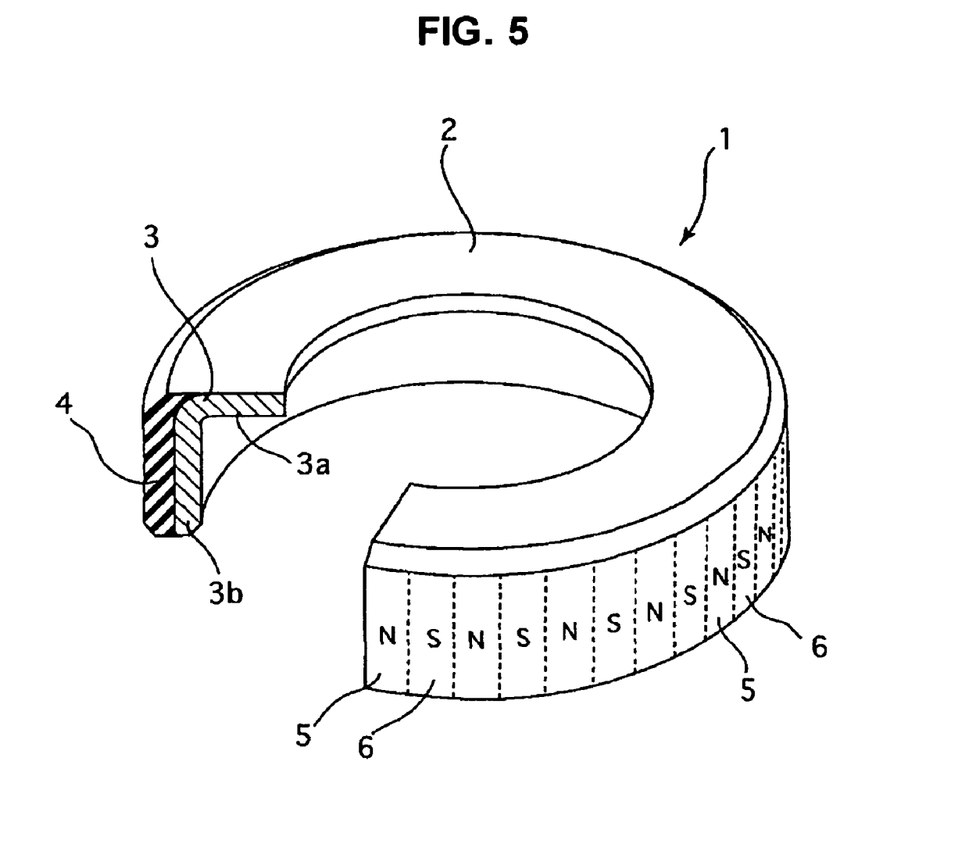
FIG. 5 is a partly cut perspective view showing a manufacturing process of an encoder in accordance with a second embodiment of the present invention.
Figure 6:
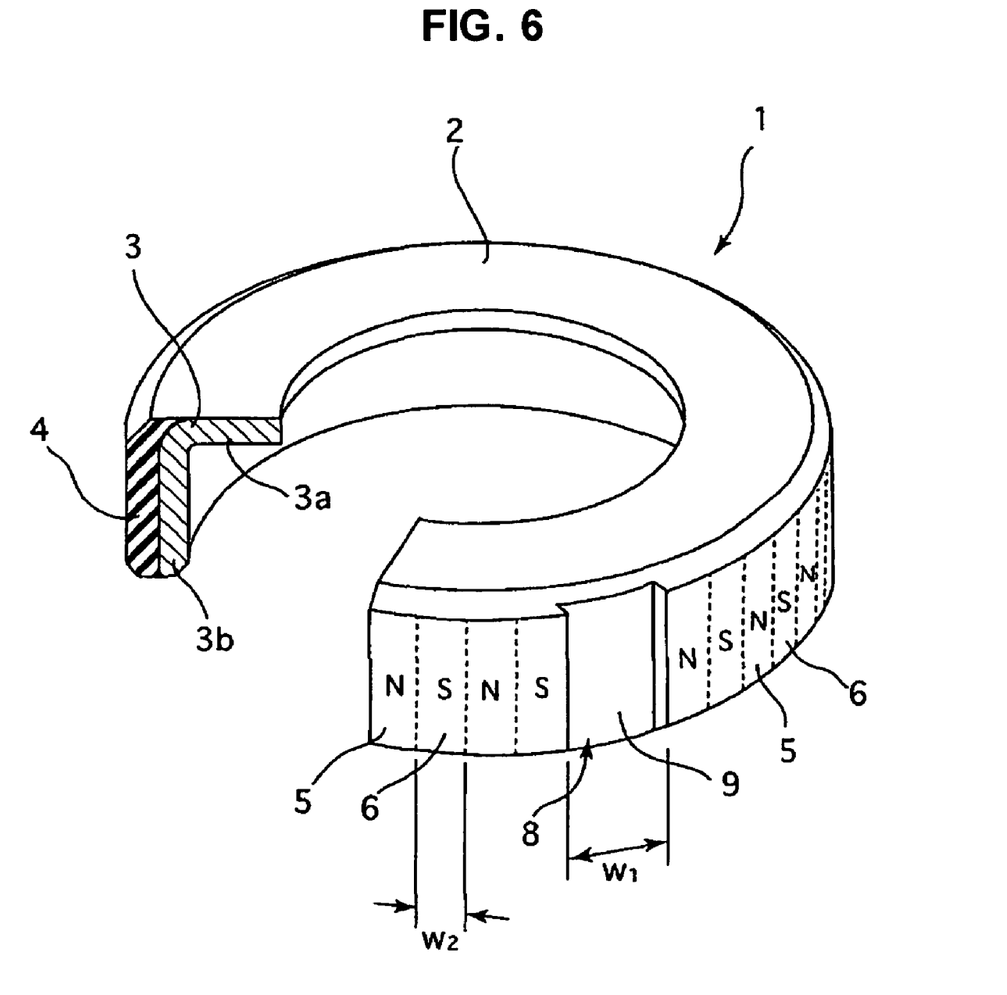
FIG. 6 is a partly cut perspective view showing a completed state of the encoder.
Figure 7:
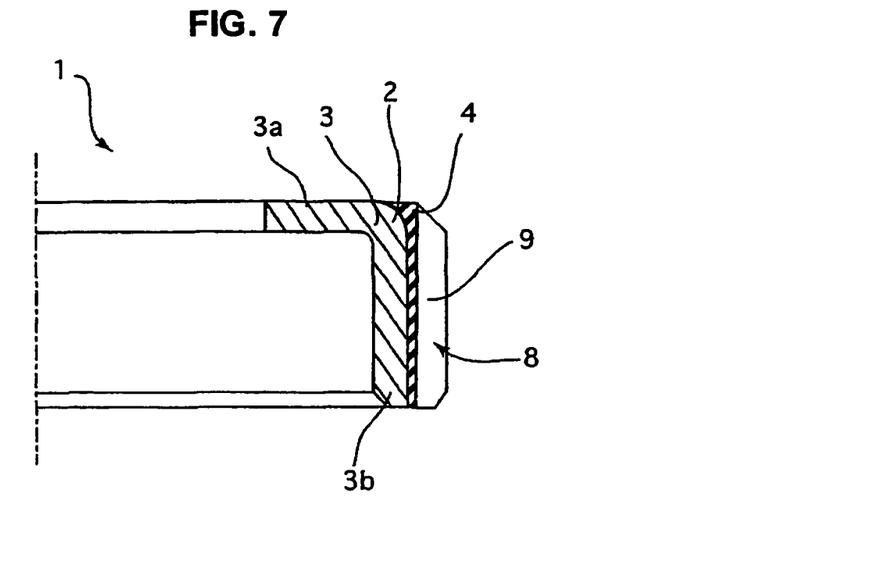
FIG. 7 is a half cut cross sectional view of the encoder.

FIGS. 5 to 7 show an encoder 1 in accordance with a second embodiment of the present invention, in which FIG. 5 is a partly cut perspective view showing a manufacturing process of the encoder 1, FIG. 6 is a partly cut perspective view showing a completed state of the encoder 1, and FIG. 7 is a half cut cross sectional view of the encoder 1, respectively.

As shown in FIG. 6, the encoder 1 in accordance with the embodiment is structured such that N poles 5 and S poles 6 of magnets are arranged alternately at an equal pitch in a circumferential direction, and an unequal pitch portion 8 is provided in a part on a circumference. As shown in FIG. 5, the encoder 1 has an encoder main body 2 in which the N poles 5 and the S poles 6 are arranged at an equal pitch all over the circumference, and a cut portion 9 provided by cutting a part on the circumference of the encoder main body 2 as shown in FIG. 6. Since the cut portion 9 is provided in a part on the circumference of the encoder main body 2, it is possible to weaken a radiation of a magnetic signal in this cut position, whereby the cut position is formed as the unequal pitch portion 8.

The encoder main body 2 has a support ring 3, and an annular magnetizing portion 4 attached to the support ring 3, and the N poles 5 and the S poles 6 are arranged in the magnetizing portion 4 at an equal pitch all over the circumference. The support ring 3 is formed in an L-shaped cross section by a magnetic body such as a metal or the like so as to integrally have an annular flat surface portion 3a and a tubular portion 3b, and the magnetizing portion 4 is attached to an outer peripheral surface of the tubular portion 3b. The magnetizing portion 4 is formed in a cylindrical shape by a rubber-like elastic material mixed with a magnetic powder therein, and is structured such that the N poles 5 and the S poles 6 are arranged at the equal pitch all over the circumference by a magnetizing means constituted by a known head system or an index system or the like.

The cut portion 9 is formed in a groove shape extending in an axial direction on an outer peripheral surface of the magnetizing portion 4, and is formed by magnetizing the magnetizing portion 4 and thereafter cutting a part on the circumference of the magnetizing portion 4 in a groove shape. A depth of the groove may be set to an entire thickness in a diametrical direction of the magnetizing portion 4, however, may be constituted by a part of the entire thickness in the diametrical direction of the magnetizing portion 4 as illustrated, as far as a difference in strength on the circumference are applied to the generated magnetic signal. Further, a width w1 in a circumferential direction of the cut portion 9 is formed larger than a width w2 of one pitch of the N poles 5 and the S poles 6 (w1>w2). Accordingly, if the cut portion 9 is provided in the encoder main body 2, the magnetizing portion 4 is cut over a larger width range than the width w2 of one pitch of the N poles 5 or the S poles 6. Therefore, the radiation of the magnetic signal is weakened in this cut position, whereby the cut position is formed as the unequal pitch portion 8. In the drawing, the width w1 in the circumferential direction of the cut portion 9 is set to a width of two pitches of the N poles 5 or the S poles 6 (w1=w2×2).

The encoder 1 having the structure mentioned above is attached to a rotating part such as a rotating shaft of the like, is combined with the magnetic sensor and is used for detecting a rotating speed, an angle of rotation and the like of the rotating part, thereby having a feature in a point that the following operations and effects can be achieved by the above structure.

Since the encoder 1 having the structure mentioned above is structured such that the unequal pitch portion 8 is formed by forming the cut portion 9 obtained by cutting a part of the magnetizing portion 4 in a part on the circumference of the encoder main body 2 so as to weaken the radiation of the magnetism at this cut position, it is not necessary to directly form the unequal pitch portion 8 in the encoder main body 2 itself, and it is enough to simply arrange the N poles 5 and the S poles 6 in the encoder main body 2 at the equal pitch all over the circumference. Accordingly, since it is possible to manufacture the encoder 1 by using the general-purpose type magnetizing head or the like having the comparatively simple structure having no unequal pitch portion, it is possible to extremely easily manufacture the encoder 1 provided with the unequal pitch portion 8.

Further, even if the general-purpose type magnetizing head or the like is used, it is possible to easily form the unequal pitch portion 8 by forming the cut portion 9 obtained by cutting a part of the magnetizing portion 4 in a part on the circumference of the encoder main body 2.

Further, it is possible to easily change a magnetic force characteristic of the encoder 1 by changing a depth or the width w1 in the circumferential direction of the cut portion 9 formed by later attaching to the encoder main body 2.

Further, in accordance with the structure mentioned above, since it is possible to check the position of the unequal pitch portion 8 on the basis of an outer appearance of the encoder 1, it is possible to easily prevent an erroneous assembly.

In this case, in the embodiment mentioned above, the process order is set such that the cut portion 9 is formed after the magnetizing portion 4 is magnetized, however, the magnetizing portion 4 may be magnetized after the cut portion 9 is formed.

Further, commonly in the first and second embodiments, the magnetizing portion 4 is provided in the outer peripheral surface of the encoder 1, however, there is a type of encoder in which the magnetizing portion is provided in an inner peripheral surface of the encoder or an end surface in an axial direction. The present invention can be applied to this type of encoder.

What is claimed is:

1. An encoder comprising
   a body having N poles and S poles of magnets arranged alternately in a circumferential direction at an equal pitch and an unequal pitch portion in a part on a circumference,
   said unequal pitch portion being formed by arranging said N poles and said S poles at an equal pitch all over the circumference and forming a shielding body shielding a magnetism portion in the part on the circumference, and
   said shielding body being formed in one of a U-shaped and J-shaped cross section, and being attached to the circumference of said body by being pressure inserted and having a magnetizing portion formed by a combination of said N poles and said S poles, thereby covering the part on the circumference of said magnetizing portion.

* * * * *